US012585915B2

(12) United States Patent
Jing

(10) Patent No.: US 12,585,915 B2
(45) Date of Patent: Mar. 24, 2026

(54) TRAINING METHOD AND APPARATUS FOR A NEURAL NETWORK MODEL, DEVICE AND STORAGE MEDIUM

(71) Applicant: Beijing Baidu Netcom Science Technology Co., Ltd., Beijing (CN)

(72) Inventor: Bo Jing, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 663 days.

(21) Appl. No.: 18/077,361

(22) Filed: Dec. 8, 2022

(65) Prior Publication Data

US 2023/0186049 A1     Jun. 15, 2023

(30) Foreign Application Priority Data

Dec. 10, 2021    (CN) .......................... 202111509658.1

(51) Int. Cl.
*G06N 3/04* (2023.01)
*H04L 9/00* (2022.01)

(52) U.S. Cl.
CPC .............. *G06N 3/04* (2013.01); *H04L 9/008* (2013.01)

(58) Field of Classification Search
CPC ....................................................... G06N 3/04
See application file for complete search history.

(56) References Cited

U.S. PATENT DOCUMENTS

| | | | |
|---|---|---|---|
| 2019/0280868 A1 | 9/2019 | Streit | |
| 2020/0394518 A1* | 12/2020 | Sirdey | ................... G06N 3/045 |
| 2021/0004718 A1* | 1/2021 | Ren | ...................... H04L 9/0825 |
| 2021/0174243 A1* | 6/2021 | Angel | .................... H04L 9/083 |

(Continued)

FOREIGN PATENT DOCUMENTS

| | | |
|---|---|---|
| CN | 112149171 A | 12/2020 |
| CN | 112149706 A | 12/2020 |
| CN | 113762502 A | 12/2021 |

OTHER PUBLICATIONS

Xu Liwu, et al.: "Recognition of power quality complex disturbances based on deep feedforward network," Electrical Measurement & Instrumentation, 57(1), (2020), pp. 62-68, with English Abstract.

(Continued)

*Primary Examiner* — Khanh B Pham
(74) *Attorney, Agent, or Firm* — NORTON ROSE FULBRIGHT US LLP

(57) ABSTRACT

Provided are a training method and apparatus for a neural network model, a device and a storage medium. The training method includes: acquiring a first feature representation ciphertext of a sample user from a first party; determining the tag ciphertext of the sample user and determining the loss error ciphertext and the gradient ciphertext of a second neuron in a second sub-neural network based on the second sub-neural network according to the first feature representation ciphertext and the tag ciphertext; controlling the first party to decrypt the gradient ciphertext of the second neuron to obtain a decryption result and updating the network parameter of the second neuron according to the decryption result acquired from the first party; and sending the loss error ciphertext of an association neuron to the first party.

16 Claims, 9 Drawing Sheets

(56) References Cited

U.S. PATENT DOCUMENTS

| | | | | |
|---|---|---|---|---|
| 2022/0083690 A1* | 3/2022 | Chen | ..................... | G06F 21/602 |
| 2022/0350898 A1* | 11/2022 | Lv | ............................. | H04L 9/16 |
| 2023/0073235 A1* | 3/2023 | Wang | .................... | G06N 20/20 |
| 2023/0342669 A1* | 10/2023 | Shao | ....................... | H04L 9/008 |
| 2025/0132901 A1* | 4/2025 | Chen | .................. | G06F 21/6245 |

OTHER PUBLICATIONS

First Search Report issued on May 30, 2023 by the CIPO in the corresponding Patent Application No. 202111509658.1, with English translation.
Office Action issued on May 31, 2023 by the CIPO in the corresponding Patent Application No. 202111509658.1, with English translation.

* cited by examiner

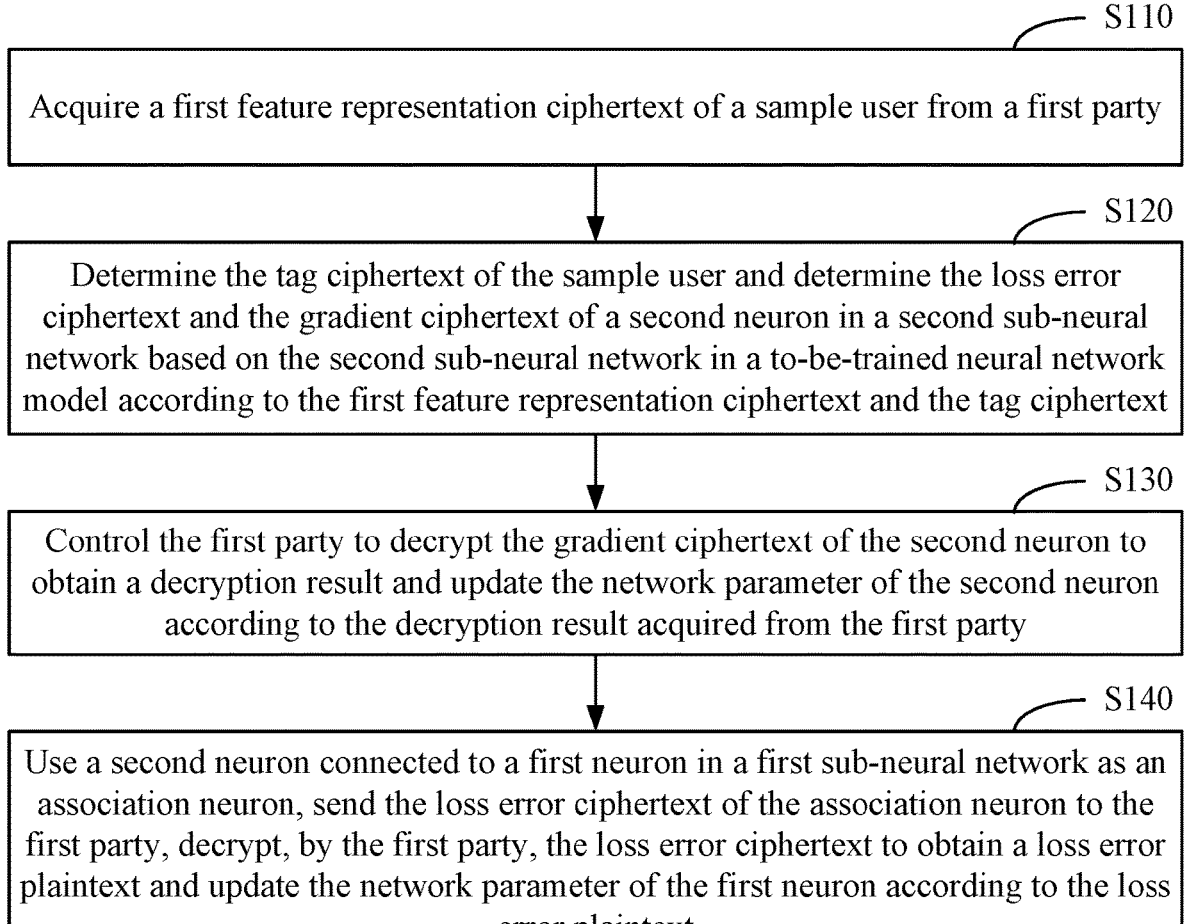

S110

Acquire a first feature representation ciphertext of a sample user from a first party

S120

Determine the tag ciphertext of the sample user and determine the loss error ciphertext and the gradient ciphertext of a second neuron in a second sub-neural network based on the second sub-neural network in a to-be-trained neural network model according to the first feature representation ciphertext and the tag ciphertext

S130

Control the first party to decrypt the gradient ciphertext of the second neuron to obtain a decryption result and update the network parameter of the second neuron according to the decryption result acquired from the first party

S140

Use a second neuron connected to a first neuron in a first sub-neural network as an association neuron, send the loss error ciphertext of the association neuron to the first party, decrypt, by the first party, the loss error ciphertext to obtain a loss error plaintext and update the network parameter of the first neuron according to the loss error plaintext

FIG. 1A

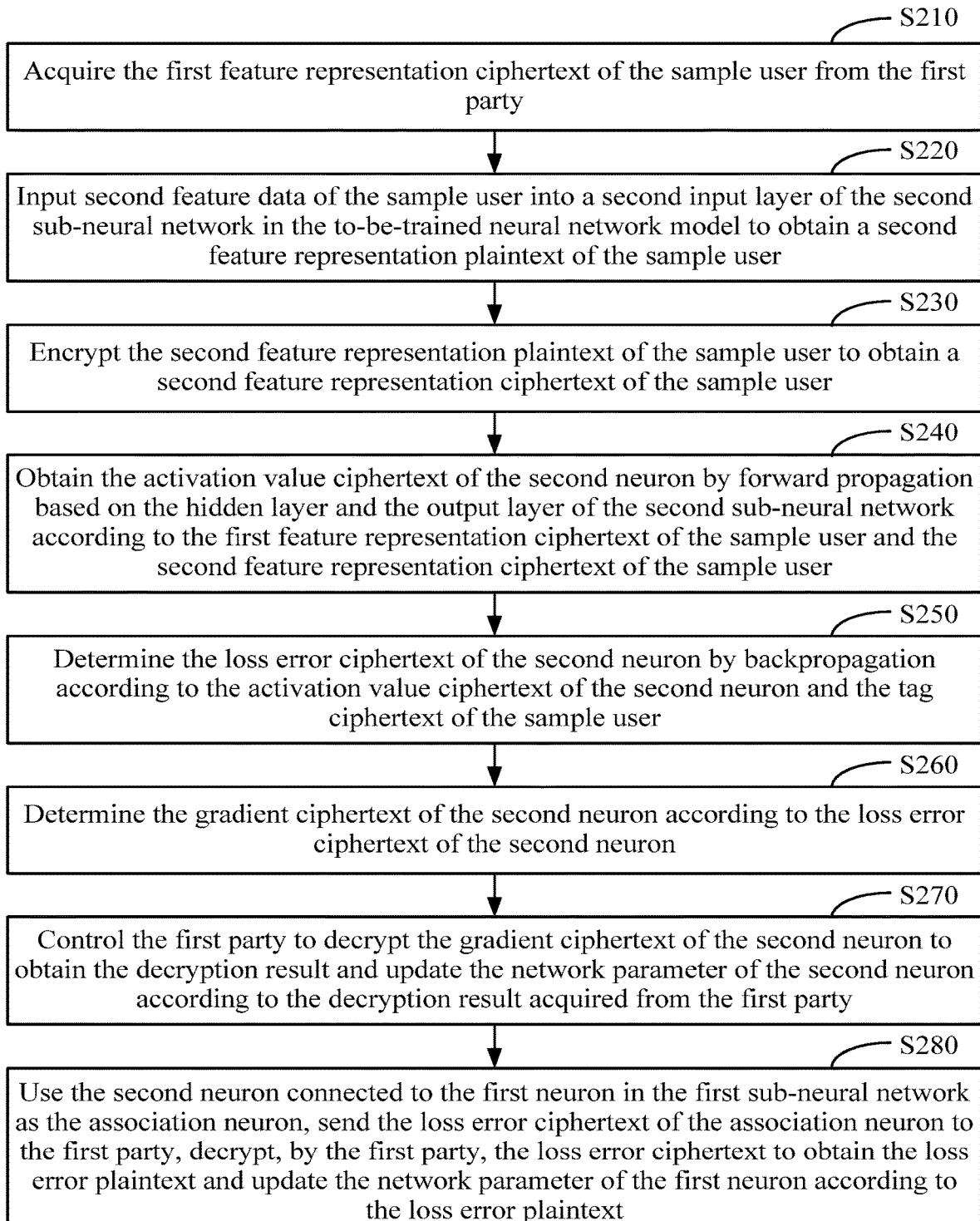

S210

Acquire the first feature representation ciphertext of the sample user from the first party

S220

Input second feature data of the sample user into a second input layer of the second sub-neural network in the to-be-trained neural network model to obtain a second feature representation plaintext of the sample user

S230

Encrypt the second feature representation plaintext of the sample user to obtain a second feature representation ciphertext of the sample user

S240

Obtain the activation value ciphertext of the second neuron by forward propagation based on the hidden layer and the output layer of the second sub-neural network according to the first feature representation ciphertext of the sample user and the second feature representation ciphertext of the sample user

S250

Determine the loss error ciphertext of the second neuron by backpropagation according to the activation value ciphertext of the second neuron and the tag ciphertext of the sample user

S260

Determine the gradient ciphertext of the second neuron according to the loss error ciphertext of the second neuron

S270

Control the first party to decrypt the gradient ciphertext of the second neuron to obtain the decryption result and update the network parameter of the second neuron according to the decryption result acquired from the first party

S280

Use the second neuron connected to the first neuron in the first sub-neural network as the association neuron, send the loss error ciphertext of the association neuron to the first party, decrypt, by the first party, the loss error ciphertext to obtain the loss error plaintext and update the network parameter of the first neuron according to the loss error plaintext

FIG. 2

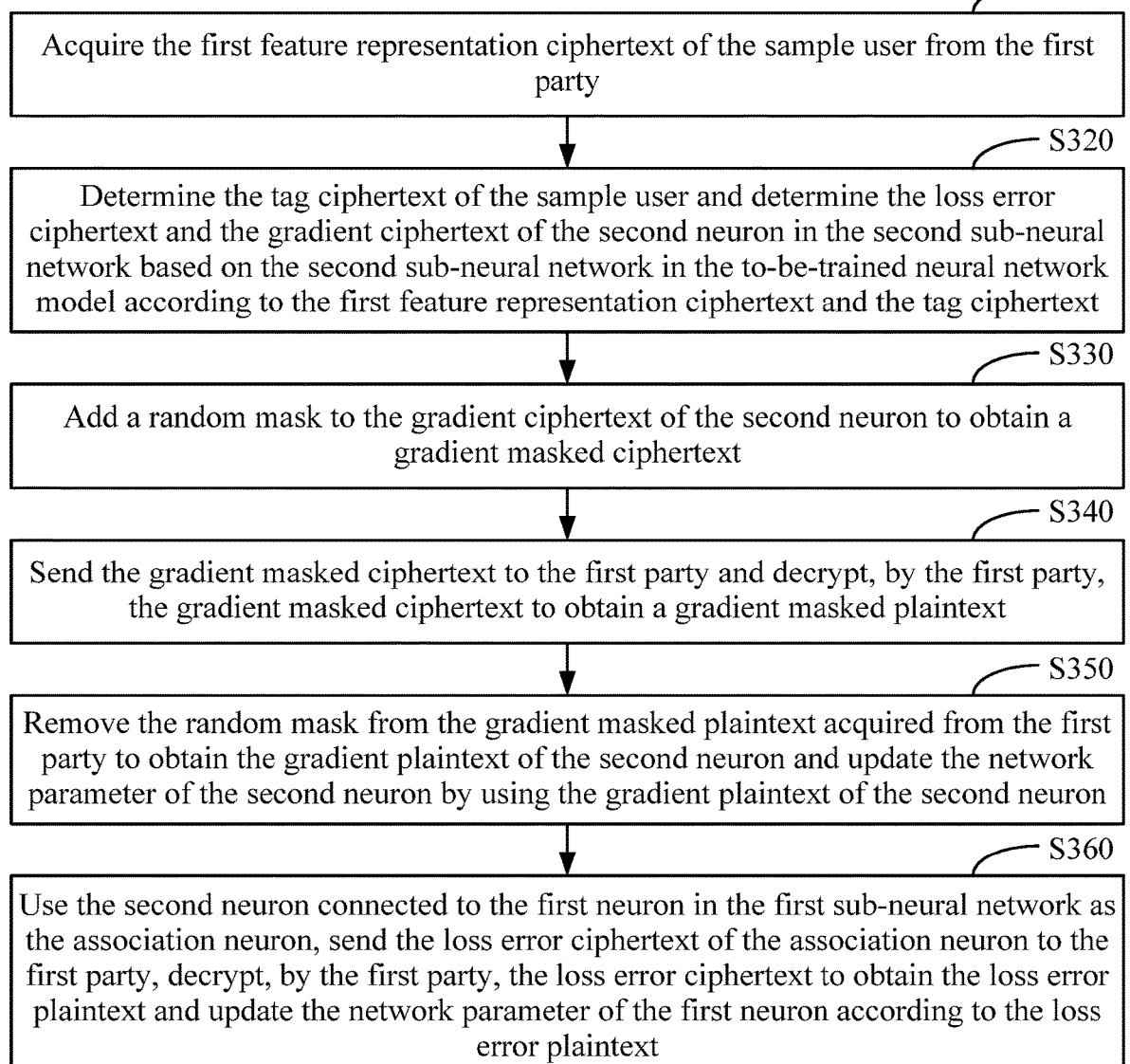

S310

Acquire the first feature representation ciphertext of the sample user from the first party

S320

Determine the tag ciphertext of the sample user and determine the loss error ciphertext and the gradient ciphertext of the second neuron in the second sub-neural network based on the second sub-neural network in the to-be-trained neural network model according to the first feature representation ciphertext and the tag ciphertext

S330

Add a random mask to the gradient ciphertext of the second neuron to obtain a gradient masked ciphertext

S340

Send the gradient masked ciphertext to the first party and decrypt, by the first party, the gradient masked ciphertext to obtain a gradient masked plaintext

S350

Remove the random mask from the gradient masked plaintext acquired from the first party to obtain the gradient plaintext of the second neuron and update the network parameter of the second neuron by using the gradient plaintext of the second neuron

S360

Use the second neuron connected to the first neuron in the first sub-neural network as the association neuron, send the loss error ciphertext of the association neuron to the first party, decrypt, by the first party, the loss error ciphertext to obtain the loss error plaintext and update the network parameter of the first neuron according to the loss error plaintext

FIG. 3

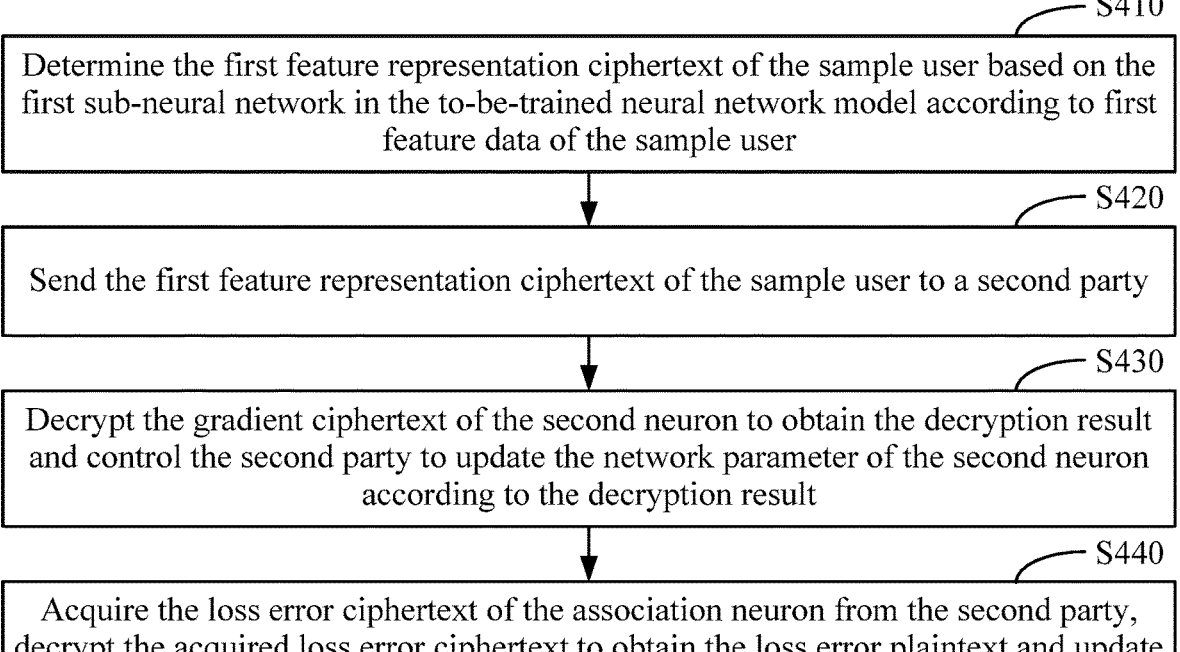

S410

Determine the first feature representation ciphertext of the sample user based on the first sub-neural network in the to-be-trained neural network model according to first feature data of the sample user

S420

Send the first feature representation ciphertext of the sample user to a second party

S430

Decrypt the gradient ciphertext of the second neuron to obtain the decryption result and control the second party to update the network parameter of the second neuron according to the decryption result

S440

Acquire the loss error ciphertext of the association neuron from the second party, decrypt the acquired loss error ciphertext to obtain the loss error plaintext and update the network parameter of the first neuron in the first sub-neural network according to the loss error plaintext, where the association neuron is the second neuron connected to the first neuron

FIG. 4

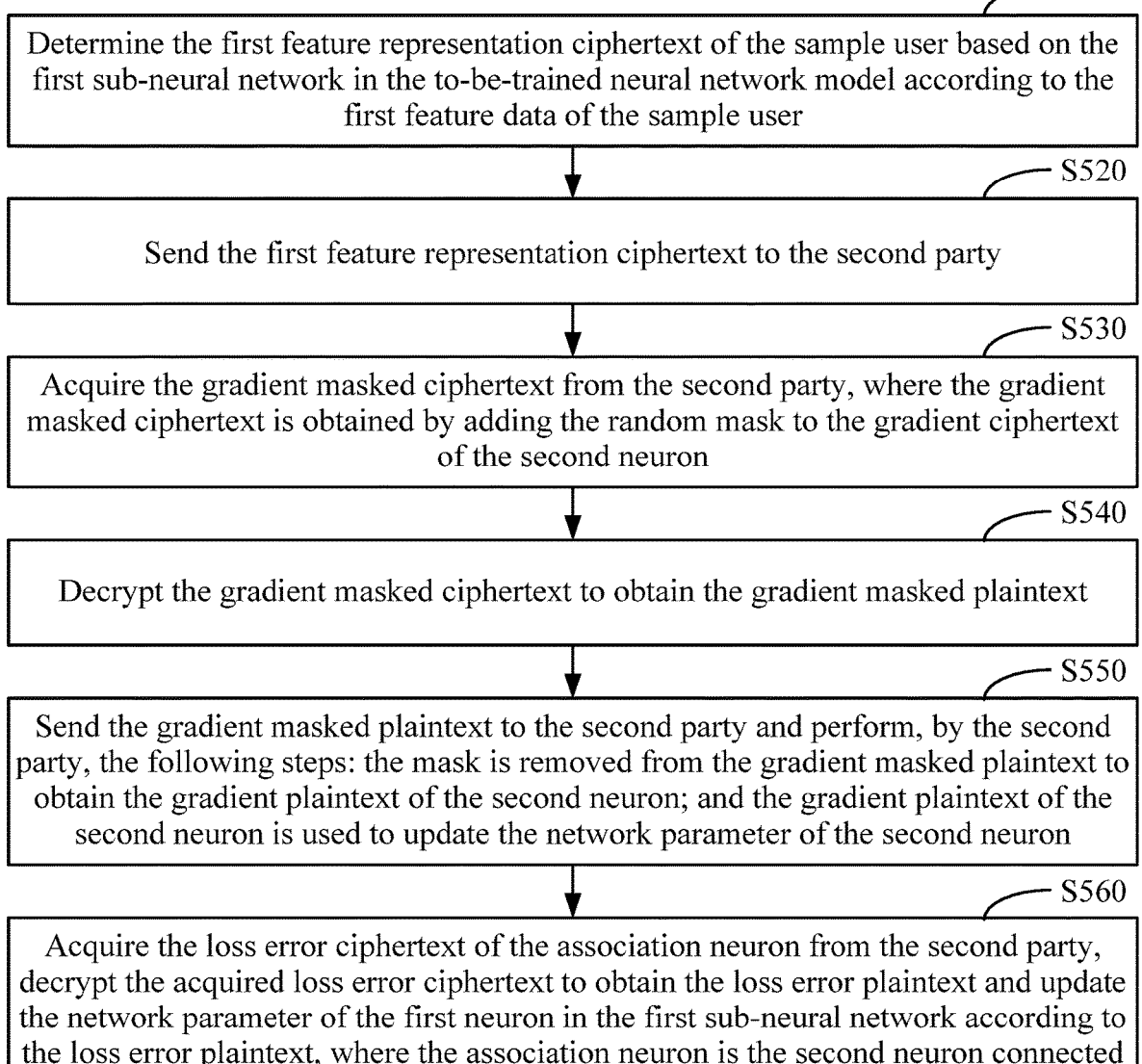

S510

Determine the first feature representation ciphertext of the sample user based on the first sub-neural network in the to-be-trained neural network model according to the first feature data of the sample user

S520

Send the first feature representation ciphertext to the second party

S530

Acquire the gradient masked ciphertext from the second party, where the gradient masked ciphertext is obtained by adding the random mask to the gradient ciphertext of the second neuron

S540

Decrypt the gradient masked ciphertext to obtain the gradient masked plaintext

S550

Send the gradient masked plaintext to the second party and perform, by the second party, the following steps: the mask is removed from the gradient masked plaintext to obtain the gradient plaintext of the second neuron; and the gradient plaintext of the second neuron is used to update the network parameter of the second neuron

S560

Acquire the loss error ciphertext of the association neuron from the second party, decrypt the acquired loss error ciphertext to obtain the loss error plaintext and update the network parameter of the first neuron in the first sub-neural network according to the loss error plaintext, where the association neuron is the second neuron connected to the first neuron

FIG. 5

TRAINING METHOD AND APPARATUS FOR A NEURAL NETWORK MODEL, DEVICE AND STORAGE MEDIUM

CROSS-REFERENCE TO RELATED APPLICATION(S)

This application claims priority to Chinese Patent Application No. 202111509658.1 filed Dec. 10, 2021, the disclosure of which is incorporated herein by reference in its entirety.

TECHNICAL FIELD

The present disclosure relates to the field of computer technology, in particular, to the fields of blockchain technology and artificial intelligence technology and, specifically, to a training method and apparatus for a neural network model, a device and a storage medium.

BACKGROUND

With the development of artificial intelligence technology, machine learning is more and more widely used in various scenarios.

Federated machine learning is an important research direction of artificial intelligence. However, in federated learning, how to use data and model machine learning on the premise that the privacy of the participants is protected is very important.

SUMMARY

The present disclosure provides a training method and apparatus for a neural network model, a device and a storage medium.

According to an aspect of the present disclosure, a training method for a neural network model is provided. The method includes the following.

A first feature representation ciphertext of a sample user is acquired from a first party. The first feature representation ciphertext is determined based on a first sub-neural network in a to-be-trained neural network model according to first feature data of the sample user.

The tag ciphertext of the sample user is determined. The loss error ciphertext and the gradient ciphertext of a second neuron in a second sub-neural network are determined based on the second sub-neural network in the to-be-trained neural network model according to the first feature representation ciphertext and the tag ciphertext.

The first party is controlled to decrypt the gradient ciphertext of the second neuron to obtain a decryption result. The network parameter of the second neuron is updated according to the decryption result acquired from the first party.

A second neuron connected to a first neuron in the first sub-neural network is used as an association neuron. The loss error ciphertext of the association neuron is sent to the first party. The loss error ciphertext is decrypted by the first party to obtain a loss error plaintext. The network parameter of the first neuron is updated according to the loss error plaintext.

According to an aspect of the present disclosure, a training method for a neural network model is provided. The method includes the following.

The first feature representation ciphertext of the sample user is determined based on the first sub-neural network in the to-be-trained neural network model according to the first feature data of the sample user.

The first feature representation ciphertext is sent to a second party. The loss error ciphertext and the gradient ciphertext of the second neuron in the second sub-neural network are determined by the second party based on the second sub-neural network in the to-be-trained neural network model according to the first feature representation ciphertext and the tag ciphertext of the sample user.

The gradient ciphertext of the second neuron is decrypted to obtain the decryption result. The second party is controlled to update the network parameter of the second neuron according to the decryption result.

The loss error ciphertext of the association neuron is acquired from the second party. The acquired loss error ciphertext is decrypted to obtain the loss error plaintext. The network parameter of the first neuron in the first sub-neural network is updated according to the loss error plaintext. The association neuron is the second neuron connected to the first neuron.

According to another aspect of the present disclosure, a training apparatus for a neural network model is provided. The apparatus includes a first feature representation ciphertext module, a homomorphic ciphertext computation module, a second neuron update module and a first neuron update module.

The first feature representation ciphertext module is configured to acquire the first feature representation ciphertext of the sample user from the first party. The first feature representation ciphertext is determined based on the first sub-neural network in the to-be-trained neural network model according to the first feature data of the sample user.

The homomorphic ciphertext computation module is configured to determine the tag ciphertext of the sample user and determine the loss error ciphertext and the gradient ciphertext of the second neuron in the second sub-neural network based on the second sub-neural network in the to-be-trained neural network model according to the first feature representation ciphertext and the tag ciphertext.

The second neuron update module is configured to control the first party to decrypt the gradient ciphertext of the second neuron to obtain the decryption result and update the network parameter of the second neuron according to the decryption result acquired from the first party.

The first neuron update module is configured to use the second neuron connected to the first neuron in the first sub-neural network as the association neuron, send the loss error ciphertext of the association neuron to the first party, decrypt, by the first party, the loss error ciphertext to obtain the loss error plaintext and update the network parameter of the first neuron according to the loss error plaintext.

According to another aspect of the present disclosure, a training apparatus for a neural network model is provided. The apparatus includes a feature representation ciphertext determination module, a feature representation ciphertext sending module, a gradient ciphertext decryption module and a first neuron update module.

The feature representation ciphertext determination module is configured to determine the first feature representation ciphertext of the sample user based on the first sub-neural network in the to-be-trained neural network model according to the first feature data of the sample user.

The feature representation ciphertext sending module is configured to send the first feature representation ciphertext to the second party and determine, by the second party, the loss error ciphertext and the gradient ciphertext of the second neuron in the second sub-neural network based on the second sub-neural network in the to-be-trained neural network model according to the first feature representation ciphertext and the tag ciphertext of the sample user.

The gradient ciphertext decryption module is configured to decrypt the gradient ciphertext of the second neuron to obtain the decryption result and control the second party to update the network parameter of the second neuron according to the decryption result.

The first neuron update module is configured to acquire the loss error ciphertext of the association neuron from the second party, decrypt the acquired loss error ciphertext to obtain the loss error plaintext and update the network parameter of the first neuron in the first sub-neural network according to the loss error plaintext. The association neuron is the second neuron connected to the first neuron.

According to another aspect of the present disclosure, an electronic device is provided. The electronic device includes at least one processor and a memory communicatively connected to the at least one processor.

The memory stores instructions executable by the at least one processor to enable the at least one processor to execute the training method for a neural network model according to any embodiment of the present disclosure.

According to another aspect of the present disclosure, a non-transitory computer-readable storage medium is provided. The storage medium stores computer instructions for causing a computer to execute the training method for a neural network model according to any embodiment of the present disclosure.

According to another aspect of the present disclosure, a computer program product is provided. The computer program product includes a computer program. When executing the computer program, a processor performs the training method for a neural network model according to any embodiment of the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

FIG. 1A is a diagram of a training method for a neural network model according to an embodiment of the present disclosure.

FIG. 2 is a diagram of another training method for a neural network model according to an embodiment of the present disclosure.

FIG. 3 is a diagram of another training method for a neural network model according to an embodiment of the present disclosure.

FIG. 4 is a diagram illustrating interactions of a training system of a neural network model according to an embodiment of the present disclosure.

FIG. 5 is a diagram illustrating interactions of a training system of a neural network model according to an embodiment of the present disclosure.

DETAILED DESCRIPTION

Figure 1B:
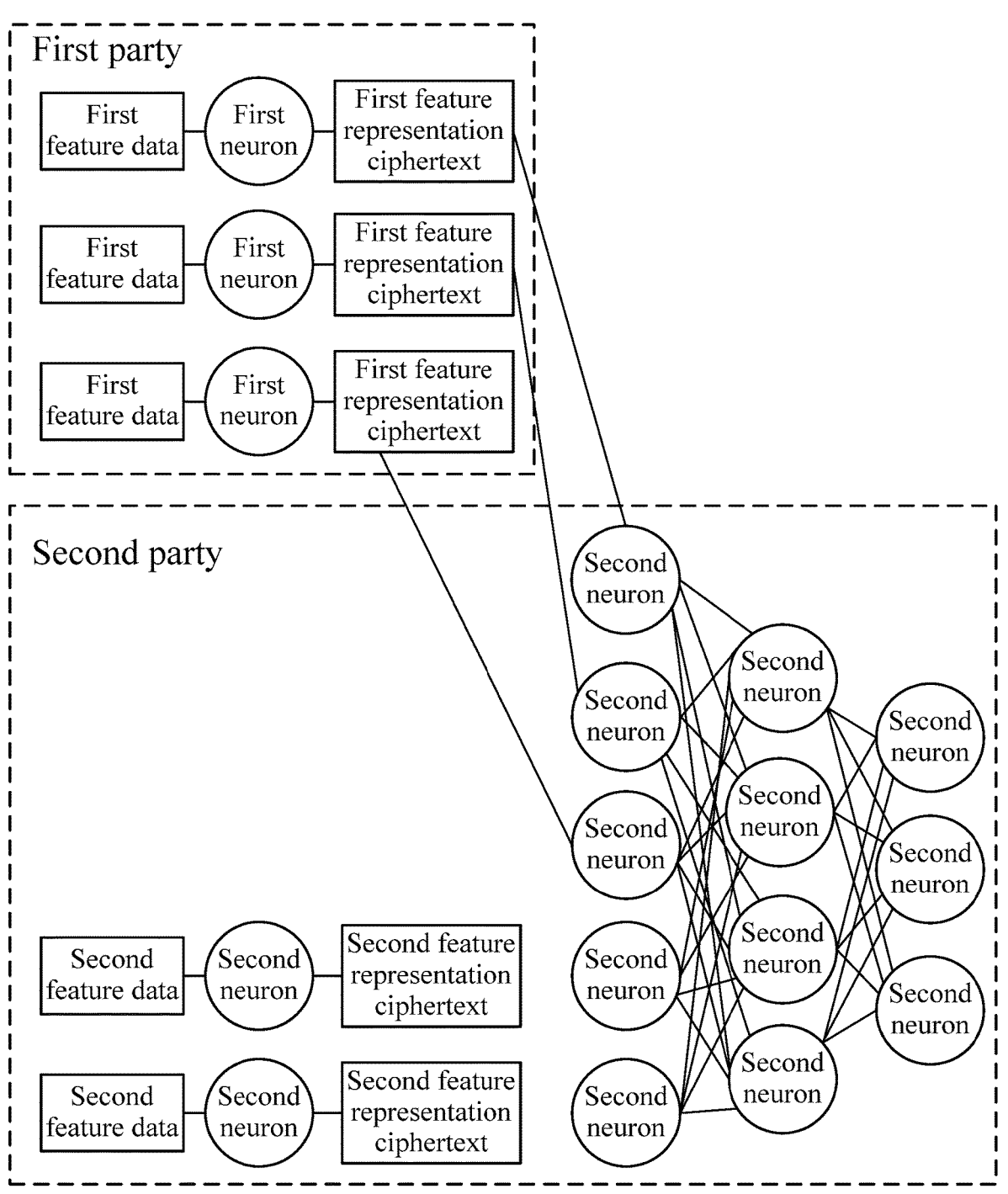
FIG. 1B is a diagram illustrating the structure of a to-be-trained neural network model according to an embodiment of the present disclosure.

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

In an embodiment of the present disclosure, a first party is a feature provider configured to provide first feature data of a sample user. A second party is a tag holder configured to provide the tag data of the sample user. A to-be-trained neural network model may include a first sub-neural network and a second sub-neural network. The first sub-neural network may be configured in the electronic device of the first party. The second sub-neural network may be configured in the electronic device of the second party. A neuron in the first sub-neural network is a first neuron. A neuron in the second sub-neural network is a second neuron.

Solutions provided in this embodiment of the present disclosure are described in detail hereinafter in conjunction with the drawings.

FIG. 1A is a diagram of a training method for a neural network model according to an embodiment of the present disclosure. This embodiment of the present disclosure may be applicable to the case where the first party and the second party learn jointly. This method may be executed by a training apparatus for a neural network model. This apparatus may be performed by hardware and/or software and may be configured in the electronic device of the second party. That is, the training method for a neural network model provided by this embodiment may be executed by the second party. Referring to FIG. 1A, this method includes the following.

In S110, a first feature representation ciphertext of a sample user is acquired from the first party. The first feature representation ciphertext is determined based on the first sub-neural network in the to-be-trained neural network model according to first feature data of the sample user.

In S120, the tag ciphertext of the sample user is determined. The loss error ciphertext and the gradient ciphertext of a second neuron in the second sub-neural network are determined based on the second sub-neural network in the to-be-trained neural network model according to the first feature representation ciphertext and the tag ciphertext.

In S130, the first party is controlled to decrypt the gradient ciphertext of the second neuron to obtain a decryption result. The network parameter of the second neuron is updated according to the decryption result acquired from the first party.

In S140, a second neuron connected to a first neuron in the first sub-neural network is used as an association neuron. The loss error ciphertext of the association neuron is sent to the first party. The loss error ciphertext is decrypted by the first party to obtain a loss error plaintext. The network parameter of the first neuron is updated according to the loss error plaintext.

The first party is the feature provider, but not a tag provider. The first party is configured to provide the first feature data of the sample user, but not to provide the tag data of the sample user, that is, the first party is configured to provide the feature data input by the to-be-trained neural network model, but not to provide the tag data. The second party is the tag holder and configured to provide the tag data of the sample user. The second party may not provide the feature data of the sample user or may also provide a second feature data of the sample user. In the case where the second party provides the second feature data of the sample user, the first feature term corresponding to the first feature data and a second feature term corresponding to the second feature data constitute a feature term input by the to-be-trained neural network model. For example, the first feature term is N, and the second feature term is M, and then the feature term input by the to-be-trained neural network model is N+M. The contents of the first feature term and the second feature term are not specifically limited in this embodiment of the present disclosure, and the to-be-input feature term may be determined according to the usage scenario of the to-be-trained neural network model.

FIG. 1B is a diagram illustrating the structure of a to-be-trained neural network model according to an embodiment of the present disclosure. Referring to FIG. 1B, the to-be-trained neural network model includes a first sub-neural network and a second sub-neural network. The first sub-neural network is configured in the first party. The second sub-neural network is configured in the second party. That is, the first party holds the first sub-neural network, and the second party holds the second sub-neural network.

In this embodiment of the present disclosure, the first party inputs the first feature data of the sample user into the first sub-neural network to obtain an output result of the first sub-neural network. The first feature representation ciphertext is obtained according to the output result of the first sub-neural network. The first party sends the first feature representation ciphertext of the sample user to the second party.

The second party may encrypt the tag data of the sample user to obtain the tag ciphertext of the sample user. The first feature representation ciphertext may be input into the second sub-neural network. The second sub-neural network performs ciphertext computation to obtain the activation value ciphertext of the output layer in the second sub-neural network. The loss function of the output layer is determined according to the tag ciphertext of the sample user and the activation value ciphertext of the output layer. The partial derivative of the loss function to the second neuron is computed to obtain the loss error ciphertext of the second neuron. The gradient ciphertext of the second neuron is obtained according to the loss error ciphertext of the second neuron and the connection weight of the second neuron. The second neuron is a neuron in the tag sub-neural network.

The second party may also send the gradient ciphertext of the second neuron to the first party. The first party decrypts the gradient ciphertext of the second neuron to obtain the decryption result. The second party may also update the network parameter of the second neuron according to the decryption result acquired from the first party. For example, the connection weight between a second neuron in the i-th layer and a second neuron in the (i+1)-th layer may be updated.

The second party also uses the second neuron connected to the first neuron as the association neuron. The loss error ciphertext of the association neuron is sent to the first party. The first party decrypts the loss error ciphertext of the association neuron to obtain the loss error plaintext of the association neuron and updates the network parameter of the first neuron by using the loss error plaintext of the association neuron. The first neuron is a neuron in the first sub-neural network. A last first neuron in the first sub-neural network is connected to the association neuron in the second sub-neural network. The last first neuron is a first neuron in the last layer.

During model training, the second party may perform ciphertext computation according to the tag ciphertext of the sample user and the feature representation ciphertext of the sample user acquired from the first party, so that the first feature data of the sample user can be prevented from being leaked to the second party. Moreover, the first party is controlled to decrypt the gradient ciphertext of the second neuron, so that the tag data of the sample user can also be prevented from being leaked to the first party. On the premise that the first party and the second party do not expose their own data privacy, there is no need to introduce a trusted third party, joint learning is implemented, and the efficiency of the model training is improved. The first party holds only the network structure of the first sub-neural network, but does not hold the network structure of the second sub-neural network. The second party holds only the network structure of the second sub-neural network, but does not hold the network structure of the first sub-neural network. That is, the first party and the second party do not have the complete structure of the to-be-trained neural network model. The first party needs to update only the network parameter of the first neuron. The second party needs to update only the network parameter of the second neuron. In this manner, training computation complexity can also be reduced, and the applicability is high.

In the technical solutions provided by this embodiment of the present disclosure, on the premise that the first party and the second party do not expose their own data privacy, there is no need to introduce the trusted third party, the joint learning is implemented, and the efficiency of the model training is improved. Moreover, the first party needs to update only the network parameter of the first neuron, and the second party needs to update only the network parameter of the second neuron. In this manner, the training computation complexity can also be reduced, and the applicability is high. In an optional embodiment, the first feature representation ciphertext is obtained by performing homomorphic encryption on a first feature representation plaintext of the sample user. The first feature representation plaintext is the output result of the first sub-neural network with regard to the first feature data of the sample user. The tag ciphertext is obtained by performing homomorphic encryption on the tag data of the sample user.

The first feature data of the sample user and the tag data of the sample user are each a data plaintext rather than a data ciphertext. The first feature data is provided by the first party, and the tag data is provided by the second party.

Specifically, the first party may input the first feature data of the sample user into the first sub-neural network to obtain the first feature representation plaintext output by the first sub-neural network and use a first-party homomorphic encryption public key to perform homomorphic encryption on the first feature representation plaintext to obtain the first feature representation ciphertext. The first party sends the first feature representation ciphertext of the sample user to the second party. The second party may use the first-party homomorphic encryption public key to perform homomorphic encryption on the tag data to obtain the tag ciphertext. It is to be noted that the first party may hold a first-party homomorphic encryption public key and a first-party homomorphic encryption private key. The first-party homomorphic encryption public key and the first-party homomorphic encryption private key form an asymmetric key pair. The second party may hold only the first-party homomorphic encryption public key, but not hold the first-party homomorphic encryption private key. The second party performs homomorphic ciphertext computation according to the first feature representation ciphertext and the tag ciphertext, and the first party is controlled to perform homomorphic encryption on the gradient ciphertext of the second neuron. In this manner, joint learning between two parties is implemented based on homomorphism encryption, and there is no need to introduce the trusted third party.

FIG. 2 is a diagram of another training method for a neural network model according to an embodiment of the present disclosure. This embodiment is an optional solution provided based on the preceding embodiments. Referring to FIG. 2, the training method for a neural network model according to this embodiment includes the following.

In S210, the first feature representation ciphertext of the sample user is acquired from the first party. The first feature representation ciphertext is determined based on the first sub-neural network in the to-be-trained neural network model according to first feature data of the sample user.

In S220, the second feature data of the sample user is input into a second input layer of the second sub-neural network in the to-be-trained neural network model to obtain a second feature representation plaintext of the sample user.

In S230, the second feature representation plaintext of the sample user is encrypted to obtain a second feature representation ciphertext of the sample user.

In S240, the activation value ciphertext of the second neuron is obtained by forward propagation based on the hidden layer and the output layer of the second sub-neural network according to the first feature representation ciphertext of the sample user and the second feature representation ciphertext of the sample user.

In S250, the loss error ciphertext of the second neuron is determined by backpropagation according to the activation value ciphertext of the second neuron and the tag ciphertext of the sample user.

In S260, the gradient ciphertext of the second neuron is determined according to the loss error ciphertext of the second neuron.

In S270, the first party is controlled to decrypt the gradient ciphertext of the second neuron to obtain the decryption result. The network parameter of the second neuron is updated according to the decryption result acquired from the first party.

In S280, the second neuron connected to the first neuron in the first sub-neural network is used as the association neuron. The loss error ciphertext of the association neuron is sent to the first party. The loss error ciphertext is decrypted by the first party to obtain the loss error plaintext. The network parameter of the first neuron is updated according to the loss error plaintext.

In this embodiment of the present disclosure, the second party may provide not only the tag data of the sample user, but also the second feature data of the sample user. The second sub-neural network may also include the second input layer, that is, the second sub-neural network may include a second input layer, a hidden layer and an output layer. The first sub-neural network includes only a first input layer, but does not include a hidden layer.

Specifically, the second party may input the second feature data of the sample user into the second input layer to obtain the second feature representation plaintext of the sample user and use the first-party homomorphic encryption public key to encrypt the second feature representation plaintext to obtain the second feature representation ciphertext. The second party may use the first feature representation ciphertext of the sample user and the second feature representation ciphertext of the sample user as input of the head hidden layer in the second sub-neural network. The activation value ciphertext of a second neuron in each layer is obtained by forward propagation of the hidden layer and the output layer. The tag provider performs backpropagation through homomorphic ciphertext computation, and the second party may also determine the loss function of the output layer according to the tag ciphertext of the sample user and the activation value ciphertext of the output layer. The partial derivative of the loss function to the second neuron is computed to obtain the loss error ciphertext of the second neuron. The gradient ciphertext of the second neuron is obtained according to the loss error ciphertext of the second neuron and the connection weight of the second neuron.

Specifically, the second sub-neural network may perform polynomial approximation to an activation function, for example, approximation is performed by using Taylor expansion to expand to an n-th power term (such as a quadratic term and a quartic term). In this manner, the loss error ciphertext of the output layer in the second sub-neural network is expanded to the hidden layer and the second input layer. The activation function is used as a sigmoid function to expand to quadratic term $f(x)=0.5+x/4$. That is, in the case where the activation value ciphertext of an output neuron in the second sub-neural network is different from the tag ciphertext, the loss function of the output layer may be determined; the loss error of the output layer is expanded to the hidden layer and the second input layer to obtain the loss error ciphertext of the hidden layer and the loss error ciphertext of the second input layer; and the adjustment amount of a weight may be determined according to the gradient adjustment amount of an error. If the accuracy of a set is verified and satisfied an expectation, or the loss error is verified and satisfied an expectation, or the number of training iterations is verified and satisfied an expectation, joint training ends. This embodiment of the present disclosure also supports the second party in providing the second feature data of the sample user. During model training, forward propagation and backpropagation are performed through homomorphic ciphertext computation. In this manner, not only the tag data can be prevented from being leaked to the first party, but also the second feature data and the activation function used by the second sub-neural network can be prevented from being leaked to the first party.

In an optional embodiment, the first sub-neural network is the first input layer. The second sub-neural network may include a second input layer, a hidden layer and an output layer. The sum of the number of first neurons in the first input layer and the number of second neurons in the second input layer is equal to the number of second neurons in the head hidden layer.

The number of second neurons in the head hidden layer is equal to the sum of the number of first neurons in the first input layer and the number of second neurons in the second input layer. The second party may use the first feature representation ciphertext and the second feature representation ciphertext as input of the head hidden layer in the second sub-neural network. The second sub-neural network performs forward propagation based on a homomorphic ciphertext to obtain the activation value ciphertext of each second neuron and performs backpropagation according to the tag ciphertext and the activation value ciphertext of each second neuron to obtain the loss error ciphertext of each second neuron. The gradient ciphertext of each second neuron is obtained according to the loss error ciphertext of each second neuron.

Specifically, the second party may build the structure of the second sub-neural network and send the number of second neurons in the head hidden layer and the number of second neurons in the second input layer to the first party. The first party determines the number of first neurons in the first input layer according to the number of second neurons in the head hidden layer and the number of second neurons in the second input layer, that is, the first party may set the number of first neurons in response to a neuron of the head hidden layer transferred by the second party. That is, the network topology from the first neuron to the head hidden layer may be initialized, and the network parameter of the first neuron may be randomly initialized. The first sub-neural network and the second sub-neural network are initialized according to the relationship between the number of second neurons in the head hidden layer and the number of first neurons in the first input layer and the number of second neurons in the second input layer. In this manner, the adaptability between the first sub-neural network and the second sub-neural network is maintained.

In the technical solutions provided by this embodiment of the present disclosure, the second party also provides the second feature data of the sample user. During model training, not only the tag data can be prevented from being leaked to the first party, but also the second feature data and the activation function used by the second sub-neural network can be prevented from being leaked to the first party, thereby implementing privacy protection in a joint learning process.

FIG. 3 is a diagram of another training method for a neural network model according to an embodiment of the present disclosure. This embodiment is an optional solution provided based on the preceding embodiments and used to describe the training process of the training model of a candidate neural network model. Referring to FIG. 3, the training method for a neural network model according to this embodiment includes the following.

In S310, the first feature representation ciphertext of the sample user is acquired from the first party. The first feature representation ciphertext is determined based on the first sub-neural network in the to-be-trained neural network model according to first feature data of the sample user.

In S320, the tag ciphertext of the sample user is determined. The loss error ciphertext and the gradient ciphertext of the second neuron in the second sub-neural network are determined based on the second sub-neural network in the to-be-trained neural network model according to the first feature representation ciphertext and the tag ciphertext.

In S330, a random mask is added to the gradient ciphertext of the second neuron to obtain a gradient masked ciphertext.

In S340, the gradient masked ciphertext is sent to the first party. The gradient masked ciphertext is decrypted by the first party to obtain a gradient masked plaintext.

In S350, the random mask is removed from the gradient masked plaintext acquired from the first party to obtain the gradient plaintext of the second neuron. The gradient plaintext of the second neuron is used to update the network parameter of the second neuron.

In S360, the second neuron connected to the first neuron in the first sub-neural network is used as the association neuron. The loss error ciphertext of the association neuron is sent to the first party. The loss error ciphertext is decrypted by the first party to obtain the loss error plaintext. The network parameter of the first neuron is updated according to the loss error plaintext.

In this embodiment of the present disclosure, the addition method for the random mask is not specifically limited. The addition method for the random mask to the second neuron is also recorded. The random mask is removed from the gradient masked plaintext based on the addition method for the random mask to obtain the gradient plaintext of the second neuron. Moreover, the second party may update the network parameter of the second neuron by using the gradient plaintext of the second neuron. For example, for any second neuron, the gradient plaintext of the second neuron may be used to update the connection weight between the second neuron and a second neuron in the next layer. Compared with directly sending the gradient ciphertext of the second neuron, the second party sends the gradient masked ciphertext to the first party, so that the gradient plaintext of the second neuron can be prevented from being leaked to the first party, and data security of the second party can be further improved.

In the technical solutions provided by this embodiment of the present disclosure, the second party adds the mask to the gradient ciphertext of the second neuron and sends the mask result to the first party for decryption, so that the gradient plaintext of the second neuron can also be prevented from being leaked to the first party, and the data security of the second party can be further improved.

In an optional embodiment, the first sub-neural network includes a first input layer and at least one first hidden layer. The second sub-neural network includes at least one second hidden layer and an output layer. The number of first neurons in the tail first hidden layer is equal to the number of second neurons in the head second hidden layer.

The second party may provide only the tag data, but not provide a second feature data. The first sub-neural network may include not only a first input layer, but also at least one first hidden layer. The first hidden layer is a hidden layer in the first sub-neural network. The second hidden layer is a hidden layer in the second sub-neural network. The tail first hidden layer is the last first hidden layer. The head second hidden layer is the first second hidden layer. That is, the to-be-trained neural network model is a distributed neural network model composed of the first sub-neural network and the second sub-neural network. The first hidden layer is adopted in the first sub-neural network, so that the security of the first feature data can be further improved.

Accordingly, a second neuron in the head second hidden layer may be connected to a first neuron in the tail first hidden layer, that is, the second neuron in the head second hidden layer is an association neuron. The first party may acquire the loss error ciphertext of the association neuron from the second party and use the first-party homomorphic encryption private key to decrypt the loss error ciphertext of the association neuron to obtain the loss error plaintext of the association neuron. Backpropagation is performed based on the network structure of the first sub-neural network according to the loss error plaintext of the association neuron to determine the gradient plaintext of the first neuron. The network parameter of the first neuron is updated according to the gradient plaintext of the first neuron.

In an optional embodiment, the method also includes the following steps: A feature use transaction request is initiated, and the feature use transaction request includes a target feature term that the second party needs to use; and a smart contract is invoked, the target feature term is matched with candidate feature terms to be provided by at least two candidate feature providers, and a target feature provider is selected from the at least two candidate feature providers according to the matching result and used as the first party.

Specifically, the second party is the tag provider, may determine a to-be-used target feature term and initiates the feature use transaction request including the target feature term. A candidate feature provider may publish a candidate feature term that the candidate feature provider can provide. The target feature term is matched with candidate feature terms. The target feature provider that is successfully matched is used as the first party. It is to be noted that the feature usage transaction request may also include information such as a usage price and a usage scenario and may also match information such as a price and a usage scenario. The second party may acquire the matching success notification of the first party from a blockchain network, and the second party and the first party are used as participants to perform joint learning. Moreover, after the joint learning, recording may also be performed in the blockchain network. The first party and the second party are matched by the smart contract in a blockchain to improve the flexibility and reliability of the joint learning.

It is to be noted that after the training of the to-be-trained neural network model is completed, the trained neural network model may be used to predict a target user. Specifically, the first feature representation ciphertext of the target user is acquired from the first party. Through the first sub-neural network, the first feature representation ciphertext of the target user may determine the first feature representation plaintext of the target user according to the first feature data of the target user and the first feature representation ciphertext is obtained by performing homomorphic encryption on the first feature representation plaintext of the target user. Homomorphic ciphertext forward propagation is performed based on the second sub-neural network according to the first feature representation ciphertext of the target user to obtain a predicted value ciphertext. A random mask is added to the predicted value ciphertext, and the first party may be controlled to perform decryption. The second party removes the random mask from the decryption result to obtain a predicted value. During prediction, data security of the target user can be protected.

FIG. 4 is a diagram of a training method for a neural network model according to an embodiment of the present disclosure. This embodiment of the present disclosure may be applicable to the case where the first party and the second party learn jointly. This method may be executed by a training apparatus for a neural network model. This apparatus may be performed by hardware and/or software and may be configured in the electronic device of the first party. That is, the training method for a neural network model provided by this embodiment may be executed by the first party. Referring to FIG. 4, the method includes the following.

In S410, the first feature representation ciphertext of the sample user is determined based on the first sub-neural network in the to-be-trained neural network model according to the first feature data of the sample user.

In S420, the first feature representation ciphertext is sent to the second party. The second party determines the loss error ciphertext and the gradient ciphertext of the second neuron in the second sub-neural network based on the second sub-neural network in the to-be-trained neural network model according to the first feature representation ciphertext and the tag ciphertext of the sample user.

In S430, the gradient ciphertext of the second neuron is decrypted to obtain the decryption result. The second party is controlled to update the network parameter of the second neuron according to the decryption result.

In S440, the loss error ciphertext of the association neuron is acquired from the second party. The acquired loss error ciphertext is decrypted to obtain the loss error plaintext. The network parameter of the first neuron in the first sub-neural network is updated according to the loss error plaintext. The association neuron is the second neuron connected to the first neuron.

The first party is the feature provider and configured to provide the first feature data of the sample user. The second party is the tag holder and configured to provide the tag data of the sample user.

The first sub-neural network in the to-be-trained neural network model is disposed in the first party, and the second sub-neural network in the to-be-trained neural network model is disposed in the second party. That is, the first party and the second party each include only part of the network structure of the to-be-trained neural network model. A first feature term to which the first feature data belongs and a second feature term to which the second feature data belongs are different, that is, the two belong to different dimension features.

Specifically, the first feature data of the sample user may be input into the first sub-neural network to obtain the output result of the first sub-neural network. The first feature representation ciphertext is determined according to the output result of the first sub-neural network. The first feature representation ciphertext of the sample user is sent to the second party. A sample user identifier may be sent to the second party. The second party may perform ciphertext forward propagation according to the first feature representation ciphertext of the sample user to obtain the activation value ciphertext of each second neuron in the second sub-neural network. Ciphertext backpropagation may be performed. A loss function ciphertext is determined according to the tag ciphertext of the sample user and the activation value ciphertext of the output neuron in the output layer. The loss function ciphertext is expanded to each second neuron in the second sub-neural network by polynomial approximation to obtain the loss error ciphertext of each second neuron. The gradient ciphertext of the second neuron is obtained according to the loss error ciphertext of the second neuron and the connection weight of the second neuron. The second party performs ciphertext forward propagation and ciphertext backpropagation to obtain the loss error ciphertext and the gradient ciphertext of the second neuron, so that the first feature data of the sample user can be prevented from being leaked to the second party.

The first party may also acquire the gradient ciphertext of the second neuron sent by the second party, decrypt the gradient ciphertext of the second neuron to obtain the decryption result and feed the decryption result back to the second party. The second party determines the gradient plaintext of the second neuron according to the decryption result and updates the network parameter of the second neuron by using the gradient plaintext of the second neuron. The first party may also acquire the loss error ciphertext of the association neuron of the first party, decrypt the loss error ciphertext of the association neuron to obtain the loss error plaintext of the association neuron and update the network parameter of the first neuron by using the loss error plaintext of the association neuron. The association neuron is the second neuron connected to the first neuron. The first party acquires the gradient ciphertext of the second neuron and the loss error ciphertext of the association neuron from the second party, but does not acquire the tag data, so that the tag data can be prevented from being leaked to the first party.

In the technical solutions provided by this embodiment of the present disclosure, on the premise that the first party and the second party do not expose their own data privacy, there is no need to introduce the trusted third party, the joint learning is implemented. Moreover, the training computation complexity can also be reduced, and the applicability is high.

In an optional embodiment, the first feature representation ciphertext of the sample user is determined in the following steps based on the first sub-neural network in the to-be-trained neural network model according to the first feature data of the sample user: The first feature data of the sample user is input into the first sub-neural network in the to-be-trained neural network model to obtain the first feature representation plaintext of the sample user; and the first feature representation plaintext is homomorphically encrypted to obtain the first feature representation ciphertext of the sample user. The tag ciphertext is obtained by performing homomorphic encryption on the tag data of the sample user. In this manner, joint learning between two parties is implemented based on homomorphism encryption, and there is no need to introduce the trusted third party.

FIG. 5 is a diagram of another training method for a neural network model according to an embodiment of the present disclosure. This embodiment is an optional solution provided based on the preceding embodiments and used to describe the training process of the training model of the candidate neural network model. Referring to FIG. 5, the training method for a neural network model according to this embodiment includes the following.

In S510, the first feature representation ciphertext of the sample user is determined based on the first sub-neural network in the to-be-trained neural network model according to the first feature data of the sample user.

In S520, the first feature representation ciphertext is sent to the second party. The second party determines the loss error ciphertext and the gradient ciphertext of the second neuron in the second sub-neural network based on the second sub-neural network in the to-be-trained neural network model according to the first feature representation ciphertext and the tag ciphertext of the sample user.

In S530, the gradient masked ciphertext is acquired from the second party. The gradient masked ciphertext is obtained by adding the random mask to the gradient ciphertext of the second neuron.

In S540, the gradient masked ciphertext is decrypted to obtain the gradient masked plaintext.

In S550, the gradient masked plaintext is sent to the second party. The second party performs the following steps: The mask is removed from the gradient masked plaintext to obtain the gradient plaintext of the second neuron; and the gradient plaintext of the second neuron is used to update the network parameter of the second neuron.

In S560, the loss error ciphertext of the association neuron is acquired from the second party. The acquired loss error ciphertext is decrypted to obtain the loss error plaintext. The network parameter of the first neuron in the first sub-neural network is updated according to the loss error plaintext. The association neuron is the second neuron connected to the first neuron.

Specifically, the first party may acquire the gradient masked ciphertext of the second neuron from the second party instead of the gradient ciphertext of the second neuron, so that the gradient plaintext of the second neuron can also be prevented from being leaked to the first party, and the data security of the second party can be further improved.

In the case where the tag holder provides the second feature data of the sample user, the first sub-neural network includes only a first input layer, but does not include a first hidden layer; and the second sub-neural network includes a second input layer, a second hidden layer and an output layer. The sum of the number of first neurons in the first input layer and the number of second neurons in the second input layer is equal to the number of second neurons in the head second hidden layer. The second neuron in the head second hidden layer connected to the first neuron is the association neuron of the first party.

In the case where the tag holder provides only the tag data of the sample user, but does not provide the second feature data of the sample user, the first sub-neural network may include a first input layer and a first hidden layer, and the second sub-neural network may include a second input layer and an output layer, but does not include a second input layer. The number of first neurons in the tail first hidden layer is equal to the number of second neurons in the head second hidden layer. Each second neuron in the head second hidden layer is an association neuron of the first party.

In the technical solutions provided by this embodiment of the present disclosure, the first party acquires the gradient masked ciphertext of the second neuron from the second party and decrypts the gradient masked ciphertext to obtain the gradient masked plaintext, so that the gradient plaintext of the second neuron can also be prevented from being leaked to the first party, and the data security of the second party can be further improved.

Figure 6:
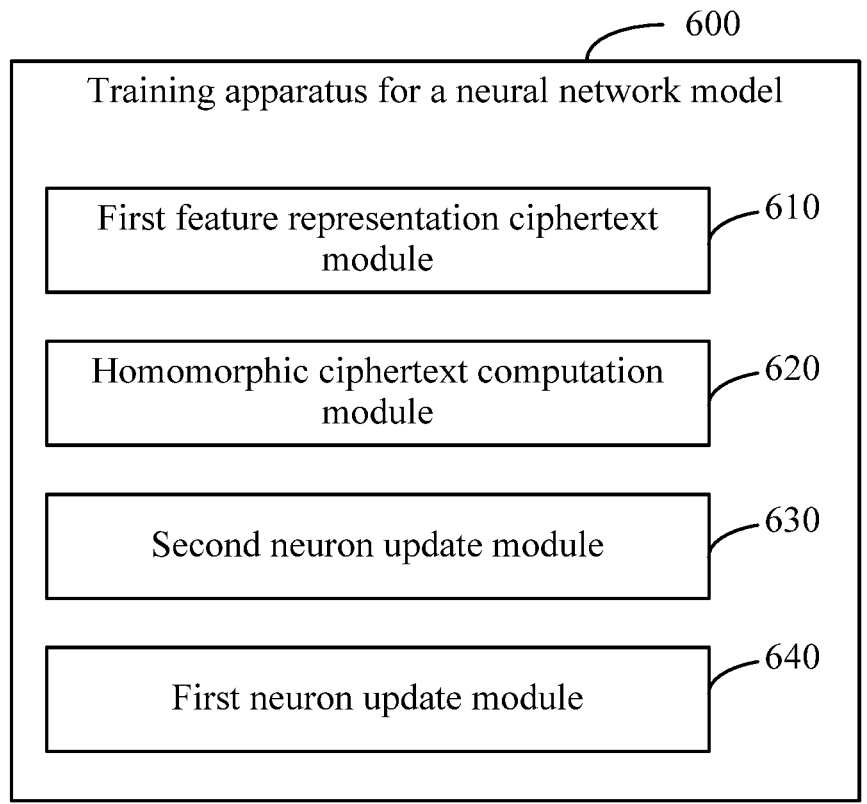
FIG. 6 is a diagram of a training apparatus for a neural network model according to an embodiment of the present disclosure.

FIG. 6 is a diagram of a training apparatus for a neural network model according to an embodiment of the present disclosure. This embodiment may be applicable to the case where joint learning is performed. The apparatus is configured in the electronic device of the second party and may implement the training method for a neural network model described in any embodiment of the present disclosure. Referring to FIG. 6, the training apparatus 600 of a neural network model includes a first feature representation ciphertext module 610, a homomorphic ciphertext computation module 620, a second neuron update module 630 and a first neuron update module 640.

The first feature representation ciphertext module 610 is configured to acquire the first feature representation ciphertext of the sample user from the first party. The first feature representation ciphertext is determined based on the first sub-neural network in the to-be-trained neural network model according to the first feature data of the sample user.

The homomorphic ciphertext computation module 620 is configured to determine the tag ciphertext of the sample user and determine the loss error ciphertext and the gradient ciphertext of the second neuron in the second sub-neural network based on the second sub-neural network in the to-be-trained neural network model according to the first feature representation ciphertext and the tag ciphertext.

The second neuron update module 630 is configured to control the first party to decrypt the gradient ciphertext of the second neuron to obtain the decryption result and update the network parameter of the second neuron according to the decryption result acquired from the first party.

The first neuron update module 640 is configured to use the second neuron connected to the first neuron in the first sub-neural network as the association neuron, send the loss error ciphertext of the association neuron to the first party, decrypt, by the first party, the loss error ciphertext to obtain the loss error plaintext and update the network parameter of the first neuron according to the loss error plaintext.

In an optional embodiment, the first feature representation ciphertext is obtained by performing homomorphic encryption on the first feature representation plaintext of the sample user. The first feature representation plaintext is the output result of the first sub-neural network with regard to the first feature data of the sample user. The tag ciphertext is obtained by performing homomorphic encryption on the tag data of the sample user.

In an optional embodiment, the homomorphic ciphertext computation module 620 includes a second feature representation plaintext unit, a second feature representation ciphertext unit, a forward propagation unit and a backpropagation unit.

The second feature representation plaintext unit is configured to input second feature data of the sample user into the second input layer of the second sub-neural network in the to-be-trained neural network model to obtain the second feature representation plaintext of the sample user.

The second feature representation ciphertext unit is configured to encrypt the second feature representation plaintext of the sample user to obtain the second feature representation ciphertext of the sample user.

The forward propagation unit is configured to obtain the activation value ciphertext of the second neuron by forward propagation based on the hidden layer and the output layer of the second sub-neural network according to the first feature representation ciphertext of the sample user and the second feature representation ciphertext of the sample user.

The backpropagation unit is configured to determine the loss error ciphertext of the second neuron by backpropagation according to the activation value ciphertext of the second neuron and the tag ciphertext of the sample user and determine the gradient ciphertext of the second neuron according to the loss error ciphertext of the second neuron.

In an optional embodiment, the first sub-neural network is the first input layer. The sum of the number of first neurons in the first input layer and the number of second neurons in the second input layer is equal to the number of second neurons in the head hidden layer.

In an optional embodiment, the first sub-neural network includes a first input layer and at least one first hidden layer. The second sub-neural network includes at least one second hidden layer and an output layer. The number of first neurons in the tail first hidden layer is equal to the number of second neurons in the head second hidden layer.

In an optional embodiment, the second neuron update module 630 includes a mask addition unit, a masked ciphertext sending unit and a mask removing unit.

The mask addition unit is configured to add the random mask to the gradient ciphertext of the second neuron to obtain the gradient masked ciphertext.

The masked ciphertext sending unit is configured to send the gradient masked ciphertext to the first party. The gradient masked ciphertext is decrypted by the first party to obtain the gradient masked plaintext.

The mask removing unit is configured to remove the random mask from the gradient masked plaintext acquired from the first party to obtain the gradient plaintext of the second neuron and update the network parameter of the second neuron by using the gradient plaintext of the second neuron.

In an optional embodiment, the training apparatus 600 of a neural network model also includes a feature term matching module. The feature term matching module includes a use request initiation unit and a feature term matching unit.

The use request initiation unit is configured to initiate the feature use transaction request. The feature use transaction request includes the target feature term that the second party needs to use.

The feature term matching unit is configured to invoke the smart contract, match the target feature term with candidate feature terms to be provided by at least two candidate feature providers and select the target feature provider from the at least two candidate feature providers according to the matching result and used as the first party.

In the solutions of this embodiment, on the premise that the first party and the second party do not expose their own data privacy, the joint learning is implemented. Moreover, the training computation complexity can also be reduced, and the applicability is high.

Figure 7:
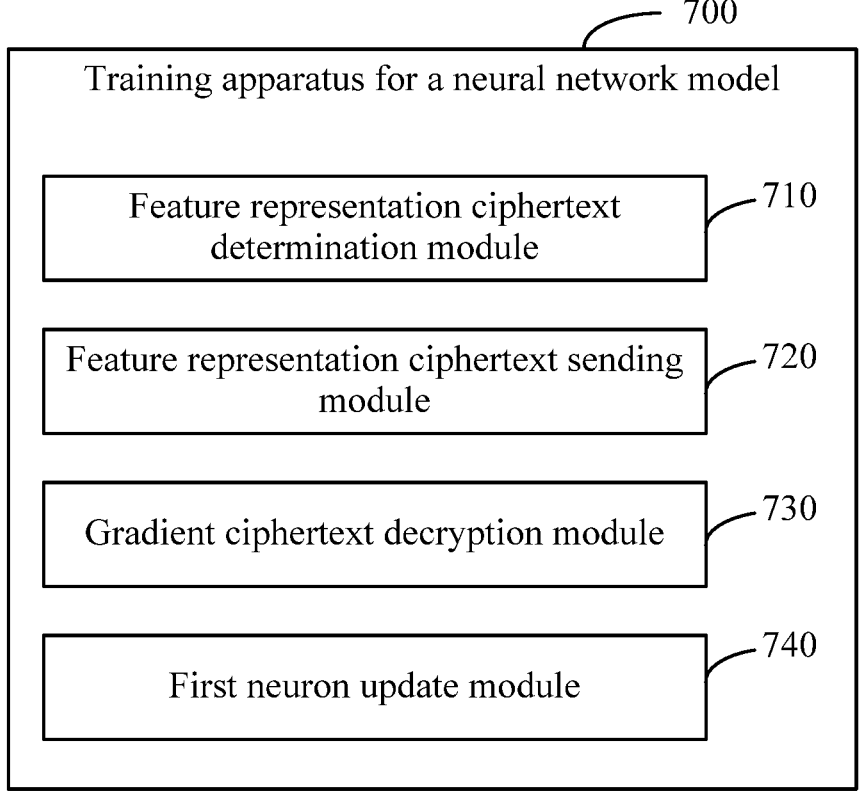
FIG. 7 is a diagram of another training apparatus for a neural network model according to an embodiment of the present disclosure.

FIG. 7 is a diagram of a training apparatus for a neural network model according to an embodiment of the present disclosure. This embodiment may be applicable to the case where the joint learning is performed. The apparatus is configured in the electronic device of the first party and may implement the training method for a neural network model described in any embodiment of the present disclosure. Referring to FIG. 7, the training apparatus 700 of a neural network model includes a feature representation ciphertext determination module 710, a feature representation ciphertext sending module 720, a gradient ciphertext decryption module 730 and a first neuron update module 740.

The feature representation ciphertext determination module 710 is configured to determine the first feature representation ciphertext of the sample user based on the first sub-neural network in the to-be-trained neural network model according to the first feature data of the sample user.

The feature representation ciphertext sending module 720 is configured to send the first feature representation ciphertext to the second party and determine, by the second party, the loss error ciphertext and the gradient ciphertext of the second neuron in the second sub-neural network based on the second sub-neural network in the to-be-trained neural network model according to the first feature representation ciphertext and the tag ciphertext of the sample user.

The gradient ciphertext decryption module 730 is configured to decrypt the gradient ciphertext of the second neuron to obtain the decryption result. The second party is controlled to update the network parameter of the second neuron according to the decryption result.

The first neuron update module 740 is configured to acquire the loss error ciphertext of the association neuron from the second party, decrypt the acquired loss error ciphertext to obtain the loss error plaintext and update the network parameter of the first neuron in the first sub-neural network according to the loss error plaintext. The association neuron is the second neuron connected to the first neuron.

In an optional embodiment, the feature representation ciphertext determination module 710 includes a first feature representation plaintext unit and a first feature representation ciphertext unit.

The first feature representation plaintext unit is configured to input the first feature data of the sample user into the first sub-neural network in the to-be-trained neural network model to obtain the first feature representation plaintext of the sample user.

The first feature representation ciphertext unit is configured to homomorphically encrypt the first feature representation plaintext to obtain the first feature representation ciphertext of the sample user.

The tag ciphertext is obtained by performing homomorphic encryption on the tag data of the sample user.

In an optional embodiment, the gradient ciphertext decryption module 730 includes a masked ciphertext acquisition unit, a masked ciphertext decryption unit and a masked plaintext sending unit.

The masked ciphertext acquisition unit is configured to acquire the gradient masked ciphertext from the second party. The gradient masked ciphertext is obtained by adding the random mask to the gradient ciphertext of the second neuron.

The masked ciphertext decryption unit is configured to decrypt the gradient masked ciphertext to obtain the gradient masked plaintext.

The masked plaintext sending unit is configured to send the gradient masked plaintext to the second party and perform, by the second party, the following steps: The mask is removed from the gradient masked plaintext to obtain the gradient plaintext of the second neuron; and the gradient plaintext of the second neuron is used to update the network parameter of the second neuron.

In the solutions of this embodiment, on the premise that the first party and the second party do not expose their own data privacy, the joint learning is implemented. Moreover, the training computation complexity can also be reduced, and the applicability is high.

Operations, including acquisition, storage, and application, on a user's personal information involved in the solution of the present disclosure conform to relevant laws and regulations and do not violate the public policy doctrine.

According to an embodiment of the present disclosure, the present disclosure also provides an electronic device, a readable storage medium and a computer program product.

Figure 8:
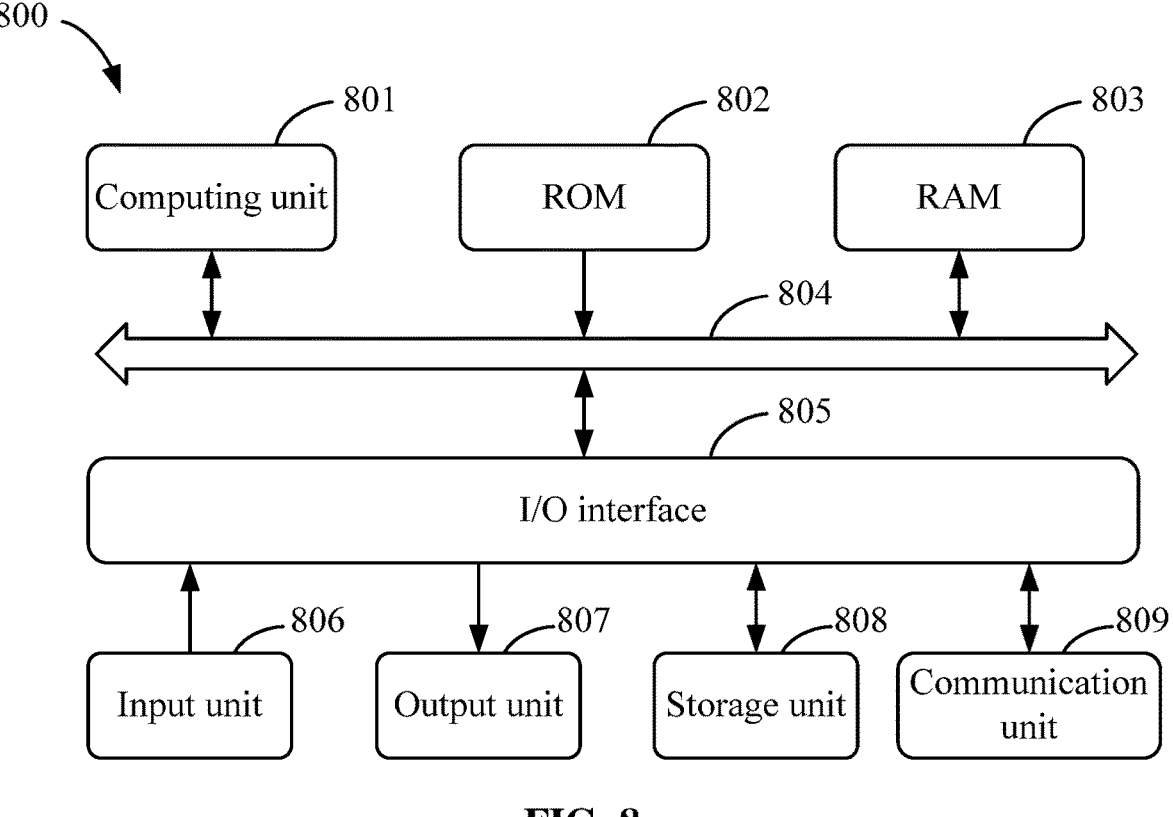
FIG. 8 is a block diagram of an electronic device for implementing a training method for a neural network model according to an embodiment of the present disclosure.

FIG. 8 is a block diagram illustrating an exemplary electronic device 800 that may be configured to perform embodiments of the present disclosure. The electronic device is intended to represent various forms of digital computers, for example, a laptop computer, a desktop computer, a workbench, a personal digital assistant, a server, a blade server, a mainframe computer and another applicable computer. The electronic device may also represent various forms of mobile apparatuses, for example, a personal digital assistant, a cellphone, a smartphone, a wearable device and a similar computing apparatus. Herein the shown components, the connections and relationships between these components, and the functions of these components are illustrative merely and are not intended to limit the implementation of the present disclosure as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802 and the RAM 803 are connected to each other by a bus 804. An input/output (I/O) interface 805 is also connected to the bus 804.

Multiple components in the device 800 are connected to the I/O interface 805. The multiple components include an input unit 806 such as a keyboard and a mouse, an output unit 807 such as various types of displays and speakers, the storage unit 808 such as a magnetic disk and an optical disk, and a communication unit 809 such as a network card, a modem or a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning model algorithms, a digital signal processor (DSP) and any appropriate processor, controller and microcontroller. The computing unit 801 executes various methods and processing described above, such as the training method for a neural network model. For example, in some embodiments, the training method for a neural network model may be implemented as a computer software program tangibly contained in a machine-readable medium such as the storage unit 808. In some embodiments, part or all of computer programs may be loaded and/or installed on the device 800 via the ROM 802 and/or the communication unit 809. When the computer programs are loaded into the RAM 803 and executed by the computing unit 801, one or more steps of the preceding training method for a neural network model may be performed. Alternatively, in other embodiments, the computing unit 801 may be configured, in any other suitable manner (for example, by means of firmware), to execute the training method for a neural network model.

Herein various embodiments of the systems and techniques described in the preceding may be performed in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementation of the methods of the present disclosure may be written in one programming language or any combination of multiple programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used with steps reordered, added or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors. Any modification, equivalent substitution, improvement and the like made within the spirit and principle of the present disclosure falls within the scope of the present disclosure.

What is claimed is:

1. A training method for a neural network model, comprising:

acquiring a first feature representation ciphertext of a sample user from a first party, wherein the first feature representation ciphertext is determined based on a first sub-neural network in a to-be-trained neural network model according to first feature data of the sample user;

determining a tag ciphertext of the sample user and determining a loss error ciphertext and a gradient ciphertext of a second neuron in a second sub-neural network based on the second sub-neural network in the to-be-trained neural network model according to the first feature representation ciphertext and the tag ciphertext;

controlling the first party to decrypt the gradient ciphertext of the second neuron to obtain a decryption result and updating a network parameter of the second neuron according to the decryption result acquired from the first party; and using a second neuron connected to a first neuron in the first sub-neural network as an association neuron, sending a loss error ciphertext of the association neuron to the first party, decrypting, by the first party, the loss error ciphertext to obtain a loss error plaintext and updating a network parameter of the first neuron according to the loss error plaintext;

wherein the determining the loss error ciphertext and the gradient ciphertext of the second neuron in the second sub-neural network based on the second sub-neural network in the to-be-trained neural network model according to the first feature representation ciphertext and the tag ciphertext comprises:

inputting second feature data of the sample user into a second input layer of the second sub-neural network in the to-be-trained neural network model to obtain a second feature representation plaintext of the sample user;

encrypting the second feature representation plaintext of the sample user to obtain a second feature representation ciphertext of the sample user;

obtaining an activation value ciphertext of the second neuron by forward propagation based on a hidden layer and an output layer of the second sub-neural network according to the first feature representation ciphertext of the sample user and the second feature representation ciphertext of the sample user;

determining the loss error ciphertext of the second neuron by backpropagation according to the activation value ciphertext of the second neuron and the tag ciphertext of the sample user; and determining the gradient ciphertext of the second neuron according to the loss error ciphertext of the second neuron.

2. The method according to claim 1, wherein the first feature representation ciphertext is obtained by performing homomorphic encryption on a first feature representation plaintext of the sample user; the first feature representation plaintext is an output result of the first sub-neural network with regard to the first feature data of the sample user; and the tag ciphertext is obtained by performing homomorphic encryption on tag data of the sample user.

3. The method according to claim 1, wherein the first sub-neural network is a first input layer; and a sum of a number of first neurons in the first input layer and a number of second neurons in the second input layer is equal to a number of second neurons in a head hidden layer.

4. The method according to claim 1, wherein the first sub-neural network comprises a first input layer and at least one first hidden layer, and the second sub-neural network comprises at least one second hidden layer and an output layer; and a number of first neurons in a tail first hidden layer of the at least one first hidden layer is equal to a number of second neurons in a head second hidden layer of the at least one second hidden layer.

5. The method according to claim 1, wherein the controlling the first party to decrypt the gradient ciphertext of the second neuron to obtain the decryption result and updating the network parameter of the second neuron according to the decryption result acquired from the first party comprise:

adding a random mask to the gradient ciphertext of the second neuron to obtain a gradient masked ciphertext;

sending the gradient masked ciphertext to the first party and decrypting, by the first party, the gradient masked ciphertext to obtain a gradient masked plaintext; and removing the random mask from the gradient masked plaintext acquired from the first party to obtain a gradient plaintext of the second neuron and updating the network parameter of the second neuron by using the gradient plaintext of the second neuron.

6. The method according to claim 1, further comprising:

initiating a feature use transaction request, wherein the feature use transaction request comprises a target feature term that a second party needs to use; and invoking a smart contract, matching the target feature term with candidate feature terms to be provided by at least two candidate feature providers, and selecting a target feature provider from the at least two candidate feature providers according to a matching result and using the target feature provider as the first party.

7. A training method for a neural network model, comprising:

determining a first feature representation ciphertext of a sample user based on a first sub-neural network in a to-be-trained neural network model according to first feature data of the sample user;

sending the first feature representation ciphertext to a second party and determining, by the second party, a loss error ciphertext and a gradient ciphertext of a second neuron in a second sub-neural network based on the second sub-neural network in the to-be-trained neural network model according to the first feature representation ciphertext and a tag ciphertext of the sample user;

decrypting the gradient ciphertext of the second neuron to obtain a decryption result and controlling the second party to update a network parameter of the second neuron according to the decryption result; and acquiring a loss error ciphertext of an association neuron from the second party, decrypting the acquired loss error ciphertext to obtain a loss error plaintext and updating a network parameter of a first neuron in the first sub-neural network according to the loss error plaintext, wherein the association neuron is a second neuron connected to the first neuron;

wherein the determining the loss error ciphertext and the gradient ciphertext of the second neuron in the second sub-neural network based on the second sub-neural network in the to-be-trained neural network model according to the first feature representation ciphertext and the tag ciphertext comprises:

inputting second feature data of the sample user into a second input layer of the second sub-neural network in the to-be-trained neural network model to obtain a second feature representation plaintext of the sample user;

encrypting the second feature representation plaintext of the sample user to obtain a second feature representation ciphertext of the sample user;

obtaining an activation value ciphertext of the second neuron by forward propagation based on a hidden layer and an output layer of the second sub-neural network according to the first feature representation ciphertext of the sample user and the second feature representation ciphertext of the sample user;

determining the loss error ciphertext of the second neuron by backpropagation according to the activation value ciphertext of the second neuron and the tag ciphertext of the sample user; and determining the gradient ciphertext of the second neuron according to the loss error ciphertext of the second neuron.

8. The method according to claim 7, wherein the determining the first feature representation ciphertext of the sample user based on the first sub-neural network in the to-be-trained neural network model according to first feature data of the sample user comprises:

inputting the first feature data of the sample user into the first sub-neural network in the to-be-trained neural network model to obtain a first feature representation plaintext of the sample user; and performing homomorphic encryption on the first feature representation plaintext to obtain the first feature representation ciphertext of the sample user, wherein the tag ciphertext is obtained by performing homomorphic encryption on tag data of the sample user.

9. The method according to claim 7, wherein the decrypting the gradient ciphertext of the second neuron to obtain the decryption result and controlling the second party to update the network parameter of the second neuron according to the decryption result comprise:

acquiring a gradient masked ciphertext from the second party, wherein the gradient masked ciphertext is obtained by adding a random mask to the gradient ciphertext of the second neuron;

decrypting the gradient masked ciphertext to obtain a gradient masked plaintext; and sending the gradient masked plaintext to the second party and performing, by the second party, the following: removing the mask from the gradient masked plaintext to obtain a gradient plaintext of the second neuron and updating the network parameter of the second neuron by using the gradient plaintext of the second neuron.

10. An electronic device, comprising:

at least one processor; and a memory communicatively connected to the at least one processor, wherein the memory stores instructions executable by the at least one processor to enable the at least one processor to execute a training method for a neural network model, and the training method comprises:

acquiring a first feature representation ciphertext of a sample user from a first party, wherein the first feature representation ciphertext is determined based on a first sub-neural network in a to-be-trained neural network model according to first feature data of the sample user;

determining a tag ciphertext of the sample user and determining a loss error ciphertext and a gradient ciphertext of a second neuron in a second sub-neural network based on the second sub-neural network in the to-be-trained neural network model according to the first feature representation ciphertext and the tag ciphertext;

controlling the first party to decrypt the gradient ciphertext of the second neuron to obtain a decryption result and updating a network parameter of the second neuron according to the decryption result acquired from the first party; and using a second neuron connected to a first neuron in the first sub-neural network as an association neuron, sending a loss error ciphertext of the association neuron to the first party, decrypting, by the first party, the loss error ciphertext to obtain a loss error plaintext and updating a network parameter of the first neuron according to the loss error plaintext;

wherein the determining the loss error ciphertext and the gradient ciphertext of the second neuron in the second sub-neural network based on the second sub-neural network in the to-be-trained neural network model according to the first feature representation ciphertext and the tag ciphertext comprises:

inputting second feature data of the sample user into a second input layer of the second sub-neural network in the to-be-trained neural network model to obtain a second feature representation plaintext of the sample user;

encrypting the second feature representation plaintext of the sample user to obtain a second feature representation ciphertext of the sample user;

obtaining an activation value ciphertext of the second neuron by forward propagation based on a hidden layer and an output layer of the second sub-neural network according to the first feature representation ciphertext of the sample user and the second feature representation ciphertext of the sample user;

determining the loss error ciphertext of the second neuron by backpropagation according to the activation value ciphertext of the second neuron and the tag ciphertext of the sample user; and determining the gradient ciphertext of the second neuron according to the loss error ciphertext of the second neuron.

11. The electronic device according to claim 10, wherein the first feature representation ciphertext is obtained by performing homomorphic encryption on a first feature representation plaintext of the sample user; the first feature representation plaintext is an output result of the first sub-neural network with regard to the first feature data of the sample user; and the tag ciphertext is obtained by performing homomorphic encryption on tag data of the sample user.

12. The electronic device according to claim 10, wherein the first sub-neural network is a first input layer; and a sum of a number of first neurons in the first input layer and a number of second neurons in the second input layer is equal to a number of second neurons in a head hidden layer.

13. The electronic device according to claim 10, wherein the first sub-neural network comprises a first input layer and at least one first hidden layer, and the second sub-neural network comprises at least one second hidden layer and an output layer; and a number of first neurons in a tail first hidden layer of the at least one first hidden layer is equal to a number of second neurons in a head second hidden layer of the at least one second hidden layer.

14. The electronic device according to claim 10, wherein the controlling the first party to decrypt the gradient ciphertext of the second neuron to obtain the decryption result and updating the network parameter of the second neuron according to the decryption result acquired from the first party comprise:

adding a random mask to the gradient ciphertext of the second neuron to obtain a gradient masked ciphertext;

sending the gradient masked ciphertext to the first party and decrypting, by the first party, the gradient masked ciphertext to obtain a gradient masked plaintext; and removing the random mask from the gradient masked plaintext acquired from the first party to obtain a gradient plaintext of the second neuron and updating the network parameter of the second neuron by using the gradient plaintext of the second neuron.

15. The electronic device according to claim 10, further comprising:

initiating a feature use transaction request, wherein the feature use transaction request comprises a target feature term that a second party needs to use; and invoking a smart contract, matching the target feature term with candidate feature terms to be provided by at least two candidate feature providers, and selecting a target feature provider from the at least two candidate feature providers according to a matching result and using the target feature provider as the first party.

16. A non-transitory computer-readable storage medium storing computer instructions for causing a computer to execute the method according to claim 1.

* * * * *